United States Patent
Furusawa et al.

(10) Patent No.: US 8,488,125 B2
(45) Date of Patent: Jul. 16, 2013

(54) OPTICAL TOMOGRAPHY APPARATUS WITH TIMING DETECTION ELEMENT INCLUDING OPTICAL RESONATOR HAVING VARIABLE RESONATOR LENGTH

(75) Inventors: Kentaro Furusawa, Tokyo (JP); Natsuhiko Mizutani, Tokyo (JP); Ryo Kuroda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 410 days.

(21) Appl. No.: 12/865,171

(22) PCT Filed: May 12, 2009

(86) PCT No.: PCT/JP2009/059107
§ 371 (c)(1),
(2), (4) Date: Jul. 29, 2010

(87) PCT Pub. No.: WO2009/139486
PCT Pub. Date: Nov. 19, 2009

(65) Prior Publication Data
US 2010/0309480 A1 Dec. 9, 2010

(30) Foreign Application Priority Data
May 13, 2008 (JP) ................................ 2008-125628

(51) Int. Cl.
*G01B 9/02* (2006.01)
(52) U.S. Cl.
USPC .............................. 356/479; 356/480; 356/519
(58) Field of Classification Search
USPC ......... 356/479, 480, 497, 519; 372/6; 385/122
See application file for complete search history.

(56) References Cited

U.S. PATENT DOCUMENTS 7,340,135 B2 * 3/2008 Okuno ........................... 385/122
2005/0238070 A1 * 10/2005 Imeshev et al. ................... 372/21

(Continued)

FOREIGN PATENT DOCUMENTS

| JP | 2008-002815 A | 1/2008 |
|---|---|---|
| JP | 2008-512686 T | 4/2008 |

(Continued)

OTHER PUBLICATIONS

Notification of Transmittal of the International Search Report and the Written Opinion of the International Search Authority mailed Aug. 28, 2009, as well as the International Search Report and the Written Opinion of the International Search Authority.

(Continued)

*Primary Examiner* — Michael A Lyons
(74) *Attorney, Agent, or Firm* — Fitzpatrick, Cella, Harper & Scinto

(57) ABSTRACT

An optical tomography imaging a tomogram by using a coherent light by a backscattering light of a measured object and a reflected light of a reference mirror, which has supercontinuum light sources, an optical system having group velocity dispersion connected to the supercontinuum light source, an optical detection element detecting a coherent light by a backscattering light of the measured object and a reflected light of the reference mirror, a timing detection element detecting a timing of each wavelength component in an output light from the optical system having the group velocity dispersion, and a unit sampling a signal from the optical detector by using a timing signal from the timing detection element with a signal from the supercontinuum light source as a trigger, and detecting an optical tomogram signal imaging a tomogram, thereby acquiring an optical tomogram at a higher speed than a conventional SS-OCT.

6 Claims, 3 Drawing Sheets

U.S. PATENT DOCUMENTS

| | | | |
|---|---|---|---|
| 2006/0187537 A1 | 8/2006 | Huber et al. | |
| 2008/0159468 A1* | 7/2008 | Chong | 378/4 |
| 2008/0252899 A1* | 10/2008 | Morosawa et al. | 356/479 |
| 2009/0034562 A1* | 2/2009 | Nicholson et al. | 372/6 |
| 2009/0046295 A1* | 2/2009 | Kemp et al. | 356/479 |

FOREIGN PATENT DOCUMENTS

| | | |
|---|---|---|
| JP | 2008-191370 A | 8/2008 |
| WO | 2006/039091 A2 | 4/2006 |

OTHER PUBLICATIONS

Notification Concerning Transmittal of International Preliminary Report on Patentability mailed Nov. 25, 2010, as well as the International Preliminary Report on Patentability.

Huber et al., Fourier Domain Mode Locking (FDML): A new laser operating regime and applications for optical coherence tomography, Optics Express, Apr. 17, 2006, vol. 14, No. 8, 3225-3237.

Moon et al., Ultra-high-speed optical coherence tomography with a stretched pulse supercontinuum source, Optics Express, Nov. 27, 2006, vol. 14, No. 24, 11575-11584.

Park et al., Optical frequency domain reflectometry based on real-time Fourier transformation, Optics Express, Apr. 16, 2007, vol. 15, No. 8, 4597-4616.

Saperstein et al., Processing advantages of linear chirped fiber Bragg gratings in the time domain realization of optical frequency-domain reflectometry, Optics Express, Nov. 12, 2007, vol. 15, No. 23, 15464-15479.

May 14, 2013 Japanese Official Action in Japanese Patent Appln. No. 2008-125628.

* cited by examiner

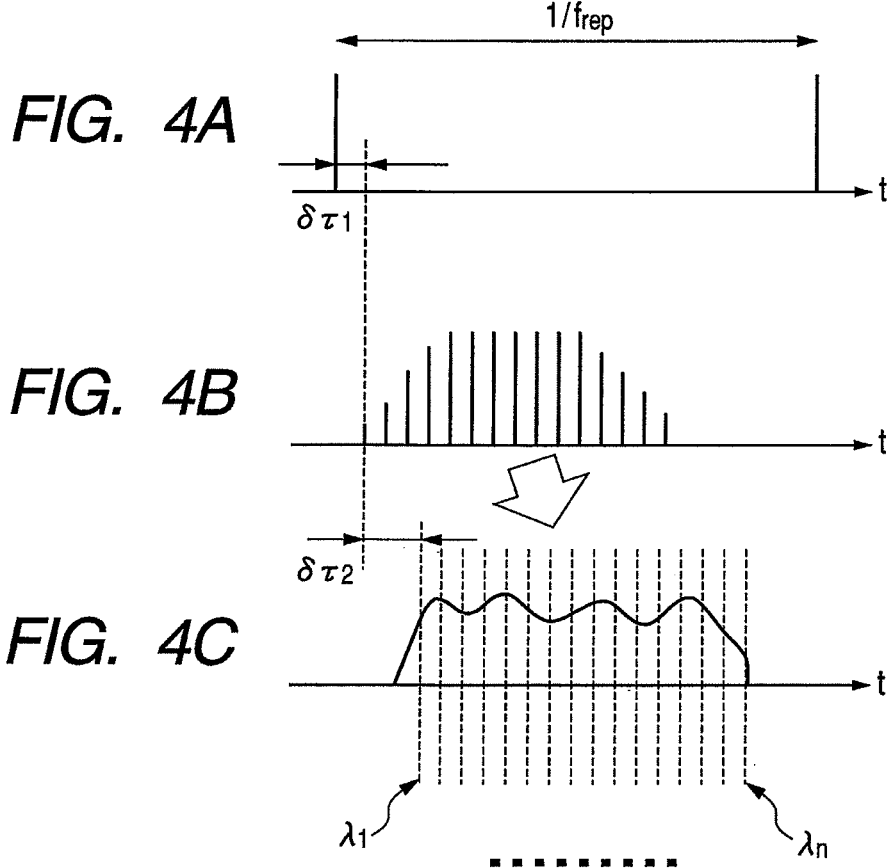

OPTICAL TOMOGRAPHY APPARATUS WITH TIMING DETECTION ELEMENT INCLUDING OPTICAL RESONATOR HAVING VARIABLE RESONATOR LENGTH

TECHNICAL FIELD

The present invention relates to an optical tomography apparatus.

BACKGROUND ART

Various ophthalmologic apparatuses using optical apparatuses are used at present.

Among them, an optical coherence tomography (Optical Coherence Tomography: hereinafter, described as OCT) can acquire a tomogram of an eyeground to a depth of several mms with a spatial resolution of the order of micrometers.

Therefore, OCT gains in importance as a diagnostic tool which gives information that cannot be obtained with a conventional scanning laser opthalmoscope (SLO).

Conventionally, as OCT, TD-OCT (Time Domain OCT) has been known as disclosed in M. Blezinski, "Optical Coherence Tomography" Wiley, London (2006).

The TD-OCT is configured to measure a coherent light with a backscattering light of a signal arm and obtain information of a depth profile, by combining a broadband light source and a Michelson interferometer and scanning delay of a reference arm.

However, with such TD-OCT, a mechanical structure is required for scanning the delay in a wide range, resulting in difficulties in realizing high-speed image acquisition.

For the purpose to overcome above difficulties, SD-OCT (Spectral Domain OCT) according to a method of measuring spectral interference has been developed.

Further, SS-OCT (Swept Source OCT) according to a method of measuring spectral interference with a single channel optical detector by using a high-speed wavelength swept laser as a light source has also been developed.

In the SS-OCT, the speed of image acquisition is essentially determined by the wavelength swept rate of the high speed wavelength swept laser.

Accordingly, a high speed wavelength swept laser is enhanced in speed, which has led to a development of a mode-locking method named a Fourier domain mode locking.

By further improving the method, a swept rate of ~200 kHz has been achieved, and a frame rate of ~900 Hz and a volume rate of 3.5 Hz have been realized (see R. Huber, et al. Opt. Exp. Vol. 14, pp. 3225 (2006)).

DISCLOSURE OF THE INVENTION

However, in the Fourier domain mode locking described above, the wavelength is also swept at a high speed by a mechanical structure as in the above described SS-OCT. Therefore, there is a limitation on enhancement in speed more than this rate, and the above described method cannot always obtain satisfaction in realizing further enhancement in speed.

For the above reason, in order to enhance a volume rate more than this, a fundamentally new approach is demanded.

In view of the above described problem, the present invention has an object to provide an optical tomography which enables acquisition of an optical tomogram at a higher speed as compared with the conventional SS-OCT.

According to the present invention, an optical tomography which enables acquisition of an optical tomogram at a higher speed as compared with the conventional SS-OCT can be realized.

Further features of the present invention will become apparent from the following description of exemplary embodiments with reference to the attached drawings.

BRIEF DESCRIPTION OF THE DRAWINGS

FIGS. 4A, 4B and 4C are diagrams illustrating a timing chart of a signal in the first embodiment of the present invention.

BEST MODES FOR CARRYING OUT THE INVENTION

Next, an optical tomography in an embodiment of the present invention will be described. In the optical tomography, a light from a light source is divided, and an optical tomogram of the measured object is imaged by using a coherent light, in which the coherent light is obtained by a back-scattering light which is one light reflected by a measured object, and a reflected light which is the other light reflected by a reference mirror.

Figure 1:
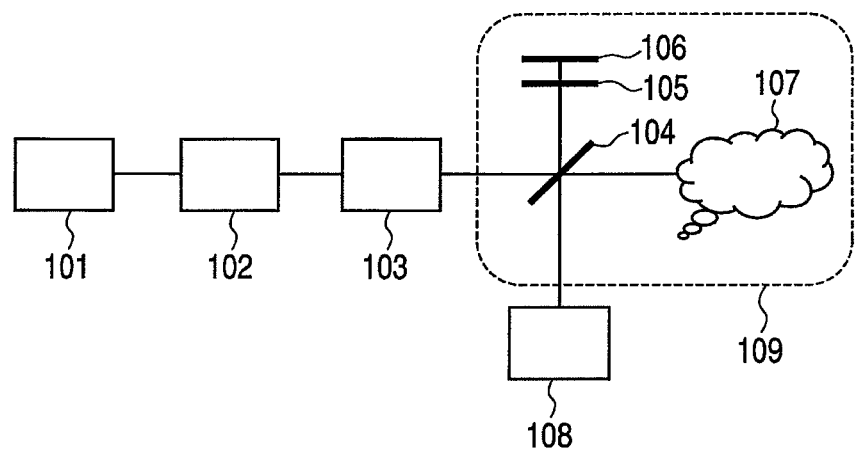
FIG. 1 is a diagram illustrating a basic configuration of an optical tomography in an embodiment of the present invention.

FIG. 1 illustrates a diagram illustrating a basic configuration of the optical tomography in the present embodiment, in which a supercontinuum light source 101, an optical system 102 having group velocity dispersion, and a synchronization circuit 103, a broadband beam splitter 104, a filter 105, a reference mirror 106, a measurement object (measured object) 107, an optical detector 108 and a Michelson interferometer 109 are arranged.

In the present invention, the above-described supercontinuum light source means a white light pulsed light source.

For example, it is a pulsed light source with a bandwidth being widened by a nonlinear optical effect in which an intense pulsed light source is used as a seed.

Further, an optical pulse compressor includes dispersion compensation elements using angular variance, such as a grating pair, a prism pair and a prism pair, or a broadband compensation element such as an optical fiber.

In the present embodiment, the optical system 102 having group velocity dispersion is connected to an output of the supercontinuum light source 101 (hereinafter, described as the light source 101) so that the output light is incident on the Michelson interferometer 109 through the optical system 102 and the synchronization circuit 103.

Further, the Michelson interferometer 109 is configured to divide the light from the light source 101 via the broadband beam splitter 104, guide one light to the measurement object (measured object) and guide the other light to the reference mirror 106.

The reference light, of which light quantity can be regulated by the filter 105, is reflected by the reference mirror 106. A signal light is incident on the measurement object 107 and generates a backscattering light. The reference light and the backscattering light are spatially superimposed on each other, and the coherent light by the superimposed reference light and backscattering light can be measured (detected) by the optical detector 108.

In this system, an optical pulse is electrically chirped (temporal waveform is adjusted) to such an extent as to enable direct observation, and therefore, a time-series signal from the optical detector may be considered to correspond to a spectral. More specifically, the analog temporal waveform to be measured corresponds to an interferogram obtained in the SD-OCT.

Accordingly, an OCT signal is obtained by performing Fourier conversion after correspondence of 1 to 1 is given to the time and wave number.

The light source 101 is desired to be widened in bandwidth by the effect of self-phase modulation by transmitting a pulse light source of a single transverse mode (for example, a mode-locked laser) through a nonlinear optical media (for example, a photonic crystal fiber).

If the bandwidth is sufficiently large, a propagation distance of a pulse can be shortened in the optical system 102 having group velocity dispersion, and therefore, propagation loss can be reduced.

Further, in order to widen the bandwidth more, the light source 101 may have an optical amplifying unit before the light is incident on the nonlinear optical media.

A repetition frequency of a mode-locked laser is generally determined by a resonator length, but the repetition frequency may be regulated to an arbitrary value by using an optical modulator outside the laser resonator.

The optical system 102 having group velocity dispersion is a system having a desired phase response, and can be composed of a normal dispersion light fiber, and thereby, the wavelength component of the optical pulse is temporally extended.

In more detail, the phase of the optical pulse can be expressed as in the following formula (1) by performing Taylor expansion in a center frequency $w_0$.

$$\phi(\omega) = \phi_0 + \phi_1(\omega - \omega_0) + \frac{\phi_2}{2!}(\omega - \omega_0)^2 + \Lambda \quad \text{Formula (1)}$$

The coefficient of the first term of the right side corresponds to an absolute phase, the coefficient of the second term corresponds to a group delay, and the coefficient of the third term corresponds to group velocity dispersion.

Specifically, the value of $\phi_2$ represents wavelength dependency of the group delay, and since the components of different colors propagate at different group velocities, the value represents the effect of the pulse width increasing.

Here, phase lead at the time of propagation in a z-direction is $\phi=n(\omega)kz$, and therefore, in order to increase $\phi_2$, a material with larger refractive index dispersion is propagated by a long distance.

Such an effect also can be realized by a geometric configuration by using, for example, a grating pair and a prism pair are used.

Further, the group velocity dispersion can be controlled also by an optical waveguide structure such as an optical fiber. The upper limit of a chirp amount is determined by the repetition frequency of the light source 101. A time width of the chirped pulse is given by the following formula (2).

$$\Delta\tau_{chirp} \sim D\Delta\lambda L \quad \text{Formula (2)}$$

Here, D [ps/nm/km] represents a dispersion parameter, L represents a propagation distance, and $\Delta\lambda$ represents a spectral width of the light source.

The dispersion parameter D is a physical amount equivalent to $\phi_2$ of formula (1), and the relationship of $DL=-2\pi c\phi_2/\lambda^2$ is satisfied.

When it is assumed that the pulse time width is 50% or less of the duty ratio of the pulse train, the upper limit of the repetition frequency of the light source is given by the following formula (3).

$$f_{rep} < \frac{1}{2\Delta\tau_{chirp}} \quad \text{Formula (3)}$$

The synchronization circuit 103 is an optical system (timing detection element) for taking out a timing of each of the wavelength components in the chirped pulse (output light).

The pulse of which bandwidth is widened in the light source 101 and is propagated by a long distance is accompanied by jitter. A slight variation of laser output also causes a timing jitter variation, and therefore, it is desirable that such a variation can be monitored in real time.

Thus, a chirped pulse is sampled by a tap coupler and is divided via an optical resonator, and timing is detected.

Figure 2:
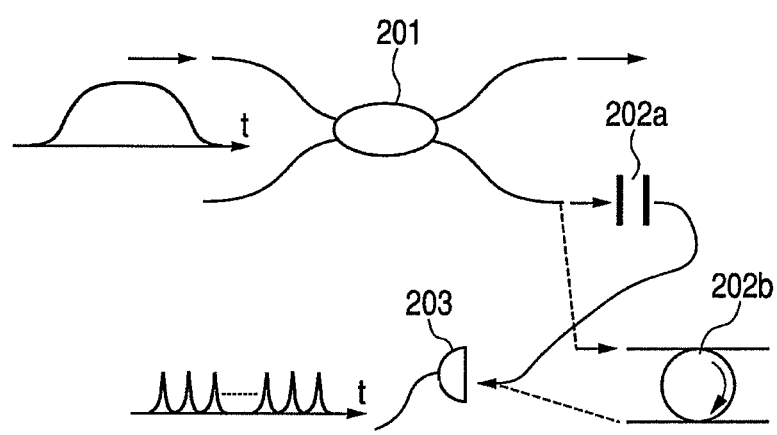
FIG. 2 is a diagram illustrating a synchronization circuit in the embodiment of the present invention.

For example, as shown in FIG. 2, the timing is detected with a high-speed photodiode 203 through a coupler 201, and through a low distribution Fabry-Perot (FP) resonator 202a or a ring resonator 202b.

The transmission spectral of the resonator is in a comb shape at substantial equal intervals in the frequency region, and the wavelength component of the pulse corresponding to the transmission bandwidth transmits through the optical resonator.

Since the incident pulse is chirped here, the output becomes a pulse train in time series, and the instant wavelength component of the chirped pulse and the information of timing are linked with each other.

In order to ensure long-term stability of the resonators, these resonators are desirably temperature-stabilized.

Further, since the pulse train corresponds to a free spectral range of the resonator, the time interval of the pulse train changes by changing the resonator length.

Accordingly, when the pulse train is used as the sampling pulse train of an OCT signal, the data point of the OCT signal can be adjusted by configuring the resonator length variable, and therefore, the data point can be decreased correspondingly to the load of the tomographic imaging.

In this case, depth resolution does not change, and data of the deep portion is not reproduced, but when the OCT signal is integrated in the sampling zone, S/N can be enhanced.

The Michelson interferometer 109 shown in FIG. 1 is the one of a free space, but a fiber type may be used if desired transmittance and reflectivity characteristics can be obtained for the bandwidth of the pulse.

The transmittance of the filter 105 and the reflectivity of the reference mirror 106 are desirably low in wavelength dependency, but it is desirable that the product of the transmittances of two of them cancels off each other and can cancel wavelength dependency.

Further, when the bandwidth is large, dispersion is desirably balanced.

The high speed optical detector 108 is desired to be capable of sufficient wavelength decomposition at a high speed.

When the bandwidth of the detector is set as if, the chirp rate $C=\Delta\lambda/\Delta\tau_{chirp}$, and therefore, the wavelength resolution is given by the following formula (4).

$$\delta\lambda = \frac{\Delta\lambda}{\Delta\tau_{chirp}\Delta f} \quad \text{Formula (4)}$$

Meanwhile, a depth resolution dz of OCT is given by the following formula (5).

$$dz \sim \frac{2\ln 2 \lambda^2}{n\pi\Delta\lambda} \quad \text{Formula (5)}$$

Further, the dynamic range of the depth in the FD-OCT is given by the following formula (6).

$$L \sim \frac{1}{4n}\frac{\lambda^2}{\delta\lambda} \quad \text{Formula (6)}$$

Here, n represents a refractive index of the media. Accordingly, the larger the bandwidth of the high speed optical detector 108 and the larger the time width of the chirped pulse, the more the performance is enhanced.

The present embodiment is configured such that by using the above configurations, the signal from the aforementioned optical detector is sampled by the timing signal from the aforementioned timing detection element with the signal from the aforementioned supercontinuum light source as a trigger.

By configuring a unit which detects an optical tomogram signal based on the sampled signal, the volume rate is further enhanced, and even video rate is enabled.

Thereby, an optical tomography capable of high-speed imaging can be realized. Specifically, according to the configuration, the output from the supercontinuum light source is temporally extended by a normal dispersion optical fiber.

Accordingly, the output can be used as a high-speed SS-OCT light source.

Further, the SS-OCT signal is detected by detecting the coherent light of the backscattering light from the measured object and the reference light, and the correspondence of the time and wavelength of the SS-OCT signal is given by the timing detection element.

Accordingly, by using the signal from the timing detection element with the signal from the inside of the supercontinuum light source as the trigger, the SS-OCT signal can be converted into the SS-OCT signal of a wavelength series, in time series.

An optical tomogram can be imaged by Fourier conversion of the signal.

On that occasion, the imaging rate of the optical tomogram is determined by repetition of the supercontinuum light source, and therefore, enhancement in speed of acquisition of an optical tomogram is enabled.

Since supercontinuum light generation depends on a complicated nonlinear optical process, the relationship of time and wavelength changes for each pulse due to a fluctuation of the pulse energy of each pulse.

By measuring the relationship of time and wavelength in real time by the timing detection element, such a fluctuation can be suppressed, and an OCT signal can be acquired with favorable repeatability.

Further, in the present embodiment, the supercontinuum light source can be configured to include a mode-locked laser, an electro-optical modulator sampling an output pulse of the mode-locked laser, an optical amplifier amplifying the pulse sampled by the electro-optical modulator, a pulse compressor temporally compressing the pulse amplified by the optical amplifier, and a nonlinear optical media on which the pulse compressed by the pulse compressor is incident.

According to the configuration, by the electro-optical modulator, the pulse train from the mode-locked laser can be converted into a desired pulse train having a period of an integral multiple of the pulse. Further, the optical loss in the electro-optical modulator is compensated by the amplifier, the excess group velocity dispersion is compensated by the pulse compressor, and the maximum peak value can be obtained with respect to the given pulse energy.

Accordingly, by causing the output light to be incident on a highly-nonlinear fiber to widen the bandwidth, supercontinuum light can be generated with high efficiency and the supercontinuum light can be output at a desired repetition frequency.

Further, in the present embodiment, an optical detector provided at a post-stage from the electro-optical modulator is included, so that an electric signal in the optical detector is used as a trigger signal from the supercontinuum light source.

According to the configuration, the electric signal in the optical detector can be made a trigger signal for acquiring an SS-OCT signal.

Further, in the present embodiment, the optical system having the group velocity distribution is composed of a normal dispersion fiber, and the nonlinear optical media in the supercontinuum light source is composed of a highly-nonlinear fiber, so that the normal dispersion fiber and the highly-nonlinear fiber can be configured to be fusion-spliced.

According to the configuration, the highly-nonlinear fiber in the supercontinuum light source is fusion-spliced with the normal dispersion fiber, and thereby, supercontinuum light can be taken out with high efficiency.

Further, in the present embodiment, the normal dispersion optical fiber can be composed of a plurality of different kinds of fibers.

According to the configuration, the dispersion slope can be controlled by the normal dispersion optical fiber being composed of a plurality of different kinds of fibers, and therefore, the profile in the pulse stretch of the supercontinuum light can be made close to a substantially linear shape.

Further, in the present embodiment, when an average amount of a group velocity dispersion parameter of the normal dispersion optical fiber is set as D, a length of the normal dispersion optical fiber is set as L, a repetition frequency of the supercontinuum light source is set as f, and the spectral width is set as $\Delta\lambda$, the values of D and L are selected so as to satisfy the following conditional expression.

$$1/10f < DL\Delta\lambda < 1/f$$

According to the configuration, the time width of the stretched white light pulse is 1/10 of the repetition frequency or more, and can be made shorter than the repetition frequency. Therefore, the supercontinuum light can be temporally stretched sufficiently, and at the same time, the bandwidth of the optical detector can be narrowed in detection of the SS-OCT signal. Thus, noise can be reduced.

Further, the peak power which is incident on the measured object is reduced.

Further, in the present embodiment, the timing detection element can be composed of an optical resonator of which a resonator length is configured to be variable, and an optical detector provided at a post-stage of the optical resonator. According to the configuration, the timing detection element is composed of the optical resonator with a variable resonator length and the optical detector placed at the post-stage of the optical resonator, whereby the pulse train according to a wavelength interval (namely, time interval) depending on the resonator length can be output as an electric signal.

Accordingly, if the resonator length is known, it can be known which wavelength component is output at what timing.

Further, since an SS-OCT signal is sampled correspondingly to the pulse train, the sampling rate of the SS-OCT signal can be made variable correspondingly to the load of optical tomogram acquisition as a result that the resonator length is variable.

Further, in the present embodiment, the resonator of the timing detection element is composed of three kinds of Fably-Perot resonators differing in resonator length.

According to the configuration, the number of data points is reduced, and S/N can be enhanced.

EMBODIMENTS

Hereinafter, embodiments of the present invention will be described.

First Embodiment

In first embodiment, a configuration example of an optical tomography to which the present invention is applied will be described.

Figure 3:
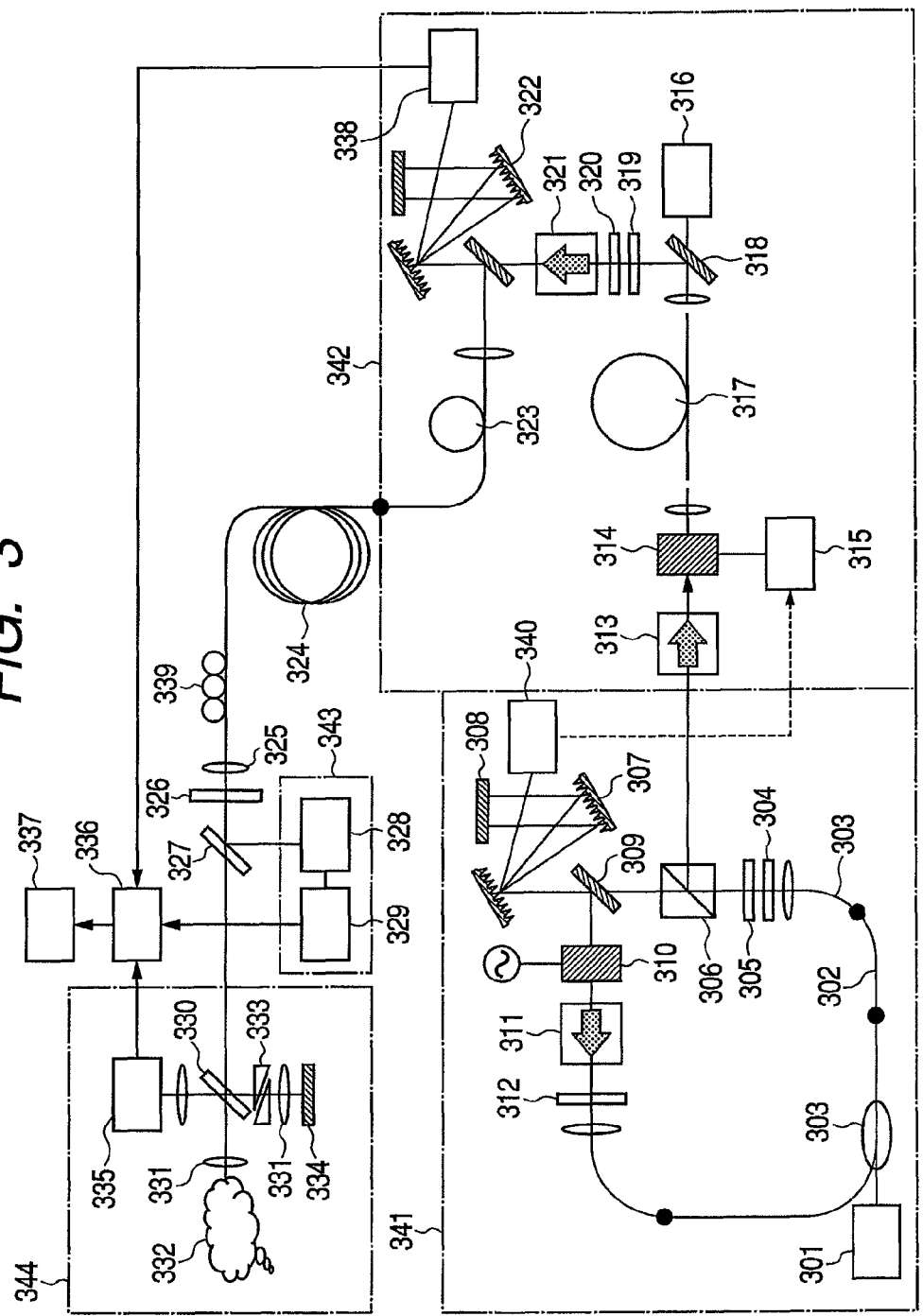
FIG. 3 is a diagram illustrating a configuration example of an optical tomography in a first embodiment of the present invention.

FIG. 3 illustrates a diagram illustrating the configuration example of the optical tomography in the present embodiment.

The present embodiment is composed of a mode-locked laser 341, an amplifier and a white light generating part 342, a synchronization circuit 343 and a Michelson interferometer 344.

Here, for the mode-locked laser 341, a stretched-pulse mode-locked fiber laser based on an Ytterbium Doped Fiber (YDF) is used.

For the excitation light source, an LD (300 mW) 301 of 980 nm is used, and via a WDM coupler 303, a YDF (8000 ppm, 70 cm) 302 which is fusion-spliced to the WDM coupler 303 is excited. Further, ¼ wavelength plates 304 and 312 and a ½ wavelength plate 305 are adjusted, and an optical gate by a nonlinear polarization rotation to a polarization beam splitter 306 is used for mode-locking.

Further, as the dispersion compensation element in the resonator, a grating pair (600 lines/mm) 307 is used.

The beam folded back by a roof mirror 308 is passed through a frequency shifter 310, an isolator 311, and the ¼ wavelength plate 312 with a steering mirror 309 to be fed back to a lead fiber.

The frequency shifter 310 is driven at 80 MHz, and enables self start of mode locking.

The output is with a center wavelength of 1050 nm, an output power of 50 mW and repetition of 50 MHz. The laser output is passed through an isolator 313 and is converted into a pulse train of 10 MHz with an electro-optical modulator (EOM) 314 which is driven with a pulse generator 315.

The pulse generator 315 is locked to the output of the optical detector 340 in the mode-locked laser 341.

This is amplified by an optical amplifier composed of a multimode LD (5 W) 316, a clad excitation YDF 317 and a WDM coupler 318.

After the polarized light is made a linearly polarized light with a ½ wavelength plate 319 and a ¼ wavelength plate 320, the linearly polarized light is passed through an isolator 321, and is pulse-compressed with a grating pair (1200 lines/mm) 322. The pulse width is 100 fs, and pulse energy is ~10 nJ. The compressed pulse is incident on a photonic crystal fiber (PCF: 1 m) 323 with a zero dispersion wavelength of 1040 nm comprising a high nonlinear fiber, and has the bandwidth widened to 300 nm.

Its coupling efficiency is ~50%.

An optical fiber 324 of a length of 4 km comprising a normal dispersion optical fiber is fusion-spliced to the PCF 323, and the fiber functions as the optical system having group velocity dispersion. The dispersion parameter is D~−70 ps/nm/km, and therefore, the pulse is widened to 84 ns. The propagation loss is ~1 dB/km, and therefore, the transmission efficiency of the optical fiber is ~40%. The output passes through a polarization light controller 339, is collimated in a collimator 325, and thereafter, is passed through a bandpass filter 326 to avoid overlap due to widening of the tail of the spectral.

The chirped pulse is taken out with a coupler 327 of 30%, and is converted into a pulse train with an FP resonator 328 of FSR of ~0.5 nm, and the pulse train is detected with a high speed photodetector (bandwidth of 12 GHz) 329.

The series of operations forms the synchronization circuit 343, and the pulse train of a period of ~140 ps is generated. A pulse after a constant delay $\delta\tau_1$ is assigned as a head to a trigger signal (signal obtained as a result of detecting a zero-order diffracted light of the optical pulse compressor with the optical detector 338), and the timing thereafter is used for assigning the wavelength of the OCT signal. Incident light of the optical detector 338 is divided in advance. The processing of them is performed in a signal processing unit 336 which will be described later.

The timing chart of this is illustrated in FIGS. 4A to 4C.

FIGS. 4A and 4B illustrate the state in which wavelength assignment is performed with the signal from the laser and the signal from the FP resonator after $\delta\tau_1$, and FIG. 4C illustrates the state in which an OCT signal C is sampled.

A time delay $\delta\tau_2$ until the OCT signal is actually sampled is fixed.

The transmitted light of the coupler is incident on the free-space type Michelson interferometer.

A beam splitter 330 is composed of a broadband dielectric multilayer, and AR coating is applied to the back surface. Signal light is incident on a sample (phantom) 332 by an achromatic lens (f=100 mm) 331.

Reference light is passed through the achromatic lens 331 similarly to the signal light, and is passed through a wedge pair 333 for balancing dispersion of the sample, and is reflected by a reference mirror 334 with the reflectivity being optimized.

The reference arm and the signal arm are given an optical path difference of about ~100 μm to avoid overlap of the OCT signal and an autorelation signal when Fourier conversion is performed.

The backscattering light is spatially superimposed on the reference light, and is incident on a high speed photodetector 335 located at a position conjugate with the collimator, and the OCT signal is detected. The incident power on the sample is 50 mW.

The bandwidth of the high speed photodetector 335 is the same (bandwidth 12 GHz) as used for the synchronization circuit 343. If the one with a narrower bandwidth is used for noise reduction, the frequency of the sampling signal from the synchronization circuit 343 is divided.

Since the sampling period of the synchronization circuit is 140 ps, the wavelength resolution is 0.5 nm, and the dynamic range is ~550 μm in the air from formula (6).

Meanwhile, the depth resolution is 1.6 μm in the air from formula (5) since the spectral bandwidth is 300 nm. Although the noise power of the detector is ~2 μW, the power of backscattering is about ~2.5 μW (backscattering coefficient ~$10^{-4}$), and since it is interference measurement, an SN of 1 or more can be ensured even in real time.

The OCT signal is sampled with the signal from the synchronization circuit 343 in the signal processing unit 336, and is taken into a data buffer.

The signal read from the data buffer is subjected to Fourier conversion, an OCT signal is detected from its side band, and is sent to an image processing and display unit 337.

In the present embodiment, the wavelength of 1 μm-band is used, and therefore, it is difficult to use a long optical fiber with consideration being given to loss of an optical fiber.

However, by using a low-loss optical fiber (For example, the one of −100 ps/nm/km with loss of 0.5 dB/km in 1.55 μm can be used.) having a larger dispersion parameter, the spectral bandwidth is narrowed down, and a dynamic range can be ensured.

A method for performing A-scan by repetition of 10 MHz is described above.

When repetition at a lower speed may be adopted, the noise level can be reduced by averaging the OCT signal.

For example, when 256 by 256 points are A-scanned at 5 Hz, the integrating time of ~3 μs can be taken for one scan, and therefore, integration can be performed 30 times, and noise can be suppressed to ⅕ or less. The signal processing unit 336 can change the number of integration times.

Second Embodiment

In the embodiment, a configuration example in which the resonator in the synchronization circuit of first embodiment is composed of three kinds of Fabry-Perot resonators differing in resonator length will be described.

The FSRs are respectively ~0.5 nm (125 GHz), ~1 nm (250 GHz) and ~1.5 nm (400 GHz), and they can be switched with a cassette.

The numbers of data points of the OCT signal using the respective resonators are 660, 330 and 200.

The point in which the present embodiment differs from first embodiment is that in the signal processing unit 336, the integration value of the sampling interval is used as a signal value for the OCT signal.

According to the present embodiment, the number of data points can be reduced, and S/N can be enhanced.

Further, when the resonator with the FSR of ~1.5 nm is used, the contrast of the region from the vicinity of the surface to 100 μm can be enhanced.

While the present invention has been described with reference to exemplary, embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-125628, filed May 13, 2008 which is hereby incorporated by reference herein in its entirety.

The invention claimed is:

1. An optical tomography apparatus which divides a light from a light source, guides one of the divided light to a sample object while guiding the other one of the divided light to a reference mirror, and by using an interfering light between a backscattering light of the sample object and a reflected light of the reference mirror, images a tomogram of the sample object, the optical tomography apparatus comprising:
a supercontinuum light source comprising the light source;
an optical system having group velocity dispersion connected to an output of the supercontinuum light source;
an optical detector detecting the interfering light;
a timing detection element detecting a timing of each wavelength component in an output light from the optical system having the group velocity dispersion; and
a unit sampling a signal from the optical detector by using a timing signal from the timing detection element with a signal from the supercontinuum light source as a trigger, and detecting an optical tomogram signal based on the sampled signal,
wherein the timing detection element comprises an optical resonator of which a resonator length is configured to be variable, and an optical detector provided at a post-stage of the optical resonator.

2. The optical tomography apparatus according to claim 1, wherein the supercontinuum light source includes:
a mode-locked laser;
an electro-optical modulator sampling an output pulse of the mode-locked laser;
an optical amplifier amplifying a pulse sampled by the electro-optical modulator;
a pulse compressor temporally compressing the pulse amplified by the optical amplifier; and
a nonlinear optical media on which a pulse compressed by the pulse compressor is incident.

3. The optical tomography apparatus according to claim 2, wherein the optical system having the group velocity distribution comprises a normal dispersion fiber,
wherein the nonlinear optical media in the supercontinuum light source comprises a highly-nonlinear fiber, and
wherein the normal dispersion fiber and the highly-nonlinear fiber are fusion-spliced.

4. The optical tomography apparatus according to claim 3, wherein the normal dispersion fiber comprises a plurality of different kinds of fibers.

5. The optical tomography apparatus according to claim 3, wherein when an average amount of a group velocity dispersion parameter of the normal dispersion fiber is set as D, a length of the normal dispersion fiber is set as L, and a repetition frequency of the supercontinuum light source is set as f, and the spectral width is set as Δλ, the following conditional expression is satisfied:

$$\tfrac{1}{10}f < DL\Delta\lambda < 1/f.$$

6. An optical tomography apparatus which divides a light from a light source, guides divided one light to a sample object while guiding divided the other light to a reference mirror, and by using a interfering light between a backscattering light of the sample object and a reflected light of the reference mirror, images a tomogram of the sample object, the optical tomography apparatus comprising:
a supercontinuum light source comprising the light source;
an optical system having group velocity dispersion connected to an output of the supercontinuum light source;
an optical detector detecting the interfering light;
a timing detection element detecting a timing of each wavelength component in an output light from the optical system having the group velocity dispersion; and
a unit sampling a signal from the optical detector by using a timing signal from the timing detection element with a signal from the supercontinuum light source as a trigger, and detecting an optical tomogram signal based on the sampled signal,
wherein the timing detection element comprises a plurality of Fabry-Perot resonators differing in resonator length, and an optical detector provided at a post-stage of the plurality of Fabry-Perot resonators.

* * * * *